United States Patent [19]

Nagoh

[11] 4,262,197
[45] Apr. 14, 1981

[54] SCANNING APPARATUS

[75] Inventor: Chiaki Nagoh, Yokohama, Japan

[73] Assignee: Tokyo Shibaura Denki Kabushiki Kaisha, Kawasaki, Japan

[21] Appl. No.: 56,083

[22] Filed: Jul. 9, 1979

[30] Foreign Application Priority Data

Jul. 13, 1978 [JP] Japan .................................. 53/85626

[51] Int. Cl.³ .............................................. H01J 3/14
[52] U.S. Cl. .................................... 250/235; 358/202
[58] Field of Search ............... 250/234, 235, 236, 563, 250/216, 571; 358/202, 203, 204, 212; 356/444

[56] References Cited

U.S. PATENT DOCUMENTS

| 3,328,522 | 6/1967 | Stone | 358/202 |
| 3,754,146 | 8/1973 | Chow | 250/235 |

Primary Examiner—David C. Nelms
Attorney, Agent, or Firm—Cushman, Darby & Cushman

[57] ABSTRACT

Disclosed is a scanning apparatus used in, for example, a facsimile copying device. A scanning mechanism carries out a time sequential scanning of a manuscript sheet by, for example, a laser. A photoelectric element holding block, having a slit for allowing the passage of scanning beams from the scanning mechanism, travels jointly with the time sequence scanning of the manuscript sheet. A plurality of photoelectric elements are set around the slit of the holding block.

3 Claims, 2 Drawing Figures

SCANNING APPARATUS

BACKGROUND OF THE INVENTION

This invention relates to a scanning apparatus which carries out time sequence scanning and photoelectrically converts the resultant optical data into electric signals.

A large number of processes are already known for scanning optical data impressed on the surface of a manuscript sheet such as a single paper sheet or the respective pages of a book by light beams, for example, laser beams and photoelectrically converting the resultant reflections into electric signals. Since, in this case, the central portion of the manuscript sheet is positioned remotest from the surrounding photoelectric conversion elements, problems have been raised due to an undesirable phenomenon generally referred to as "shading" appearing in the central portion of the manuscript sheet. This shading phenomenon becomes noticeable particularly when the manuscript sheet has a large size.

SUMMARY OF THE INVENTION

This invention has been accomplished in view of the above-mentioned circumstances and is intended to provide a scanning apparatus which eliminates the appearance of an undesirable phenomenon such as shading from the entire surface of a manuscript sheet being scanned by applying a relatively small number of photoelectric conversion elements, thereby providing good electric signals.

To attain the above-mentioned object, this invention provides a scanning apparatus which comprises:

a scanning mechanism for carrying out the time sequence scanning of the surface of a manuscript sheet by scanning beams issued from a scanning beam generator;

a photoelectric conversion element-holding block which has a slit allowing for the passage of scanning beams issued from the scanning mechanism and can move along the surface of the manuscript sheet jointly with the time sequence scanning by scanning beams in a direction transverse to the scanning direction of the scanning beams; and a plurality of photoelectric conversion elements arranged around said slit of the photoelectric conversion element-holding block to photoelectrically convert reflections from the surface of the manuscript sheet into electric signals.

DETAILED DESCRIPTION OF THE INVENTION

Figure 1:
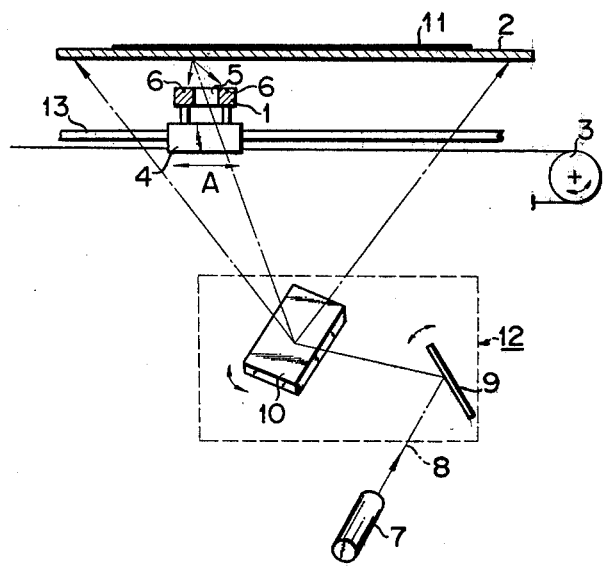
FIG. 1 schematically illustrates a scanning apparatus embodying this invention.

There will not be described by reference to the accompanying drawings, a scanning apparatus embodying this invention. Reference numeral 1 denotes a photoelectric conversion element-holding block positioned below a manuscript table 2. This block 1 is mounted on a carriage 4 driven by a drive mechanism 3 consisting of, for example, an endless belt. The block 1 reciprocates along the underside of the manuscript table 2 in a direction A transverse to the scanning direction of scanning beams.

Figure 2:
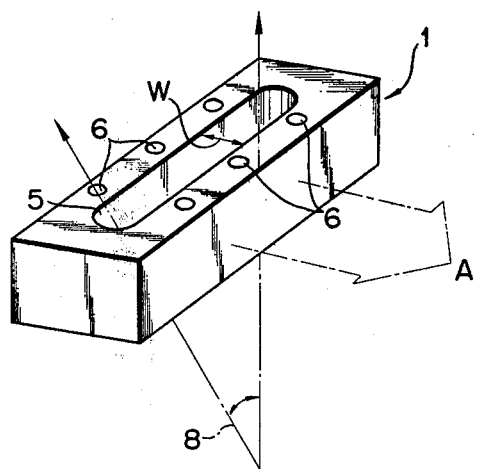
FIG. 2 is an oblique view of the main section of the scanning apparatus of the invention

As shown in FIG. 2, the photoelectric conversion element-holding block 1 is provided with a narrow scanning beam passage slit 5 extending in a direction transverse to that in which the holding block 1 travels, that is, in a direction in which scanning is carried out by scanning beams. A plurality of photoelectric conversion elements 6 are arranged on both lateral sides of the scanning beam passage slit 5 in a manner to face each other. First and second light deflectors 9, 10 for deflecting scanning beams 8 emitted from a scanning beam generator 7, for example, a laser ray generator are provided below the course along which the holding block 1 travels. The scanning beam generator 7 and first and second light deflectors 9, 10 collectively constitute a scanning mechanism 12 for carrying out the time sequence scanning of a manuscript sheet 11 placed on the table 2. Reference numeral 13 denotes rails for guiding the carriage 4. Scanning beams 8 sent forth from the scanning beam generator 7 pass through the first light deflector 9 for controlling horizontal scanning and the second light deflector 10 for controlling vertical scanning and define a locus of light scanning such as raster scanning on the impressed surface of the manuscript sheet placed on the table 2.

When the scanning mechanism 12 carries out time sequence scanning, the drive mechanism 3 of the carriage 4 carrying the photoelectric conversion element-holding block 1 is put into operation to cause the holding block 1 t reciprocate at a prescribed speed in a direction transverse to the scanning direction of the scanning beams. At this time, the scanning beams 8 which have passed through the narrow slit 5 scan the impressed surface of the manuscript sheet 11. Reflections from the impressed surface of the manuscript sheet 11 enter the photoelectric conversion elements 6 to be converted into electric signals.

It is preferred to define the width W of the scanning beam passage slit 5 of the holding block 1 to a proper level, for example, 10 mm in anticipation of the occurrence of a difference between the traveling speed of the holding block 1 and the swing speed of the second light deflector 10.

The holding block 1 always travels at a speed designed to pursue the movement of the scanning beams 8 which have been deflected by the second light deflector 10, thereby enabling the scanning beams 8 to pass through the slit 5 without fail for the scanning of the impressed surface of the manuscript sheet 11. Reflections from said surface are received by the photoelectric conversion elements 6. As a result, it is possible to provide electric signals which are substantially free from shading and accurately represent impressions on the surface of the manuscript sheet 11.

According to this invention, the scanning beam passage slit 5 is set between two parallel rows of photoelectric conversion elements 6. Reflections from the impressed surface of the manuscript sheet 11 are converted into electric signals from the total result of photoelectric conversion by all the photoelectric conversion elements 6. Even when, therefore, the relative positions of the scanning beam passage slit 5 and the scanning beam 8 are somewhat damaged, uniform electric signals can always be provided.

With the scanning apparatus of this invention, the photoelectric conversion elements 6 mounted on the holding block 1 are moved jointly with the time sequence scanning by scanning beams of the impressed surface of the manuscript sheet 11, and received reflections from said surface in pursuit of the movements of scanning beams deflected by the deflections 9, 10. Unlike the prior art scanning device in which photoelectric conversion elements are fixedly arranged to surround a manuscript sheet, the scanning apparatus of this invention reduces the required number of photoelectric conversion elements 6, and always provides good electric signals free from shading, regardless of the size of a manuscript sheet 11. Moreover, the photoelectric conversion elements 6 arranged on both sides of the scanning beam passage slit 5, can sensitively catch reflections from the impressed surface of the manuscript sheet 11.

With the foregoing embodiment, a plurality of photoelectric conversion elements 6 were arranged along both lateral sides of the narrow scanning beam-passsage slit 5. However, the arrangement of the photoelectric conversion elements 6 need not be restricted to this pattern. Namely, the photoelectric conversion elements 6 may be set all along or in part of the periphery of the scanning beam slit 5.

Electric signals obtained from the scanning apparatus of this invention can be applied to a facsimile or electronic copying machine or any other similar device by means of a known signal-treating circuit.

What is claimed is:

1. A scanning apparatus comprising:
    a scanning mechanism for carrying out the time sequence scanning of the impressed surface of manuscript sheet by scanning beams issued from a scanning beam generator;
    a photoelectric conversion element-holding block which has a slit allowing for the passage of scanning beams and travels jointly with time sequence scanning by scanning beams along the impressed surface of the manuscript sheet in a direction transverse to that in which the time sequence scanning is carried out by scanning beams; and
    a plurality of photoelectric conversion elements mounted on the photoelectric conversion element-holding block along the periphery of the scanning beam passage slit to photoelectrically convert reflections from the impressed surface of the manuscript sheet into electric signals.

2. The scanning apparatus according to claim 1, wherein the scanning beam passage slit is made narrow and fully long in a direction in which the time scanning is carried out by scanning beams; and said slit has a sufficiently great width to allow for the occurrence of a difference between the movement of the photoelectric conversion element-holding block and the movement of a light deflector for deflecting scanning beams in a direction transverse to that in which the time sequence scanning is carried out by scanning beams.

3. The scanning apparatus according to claim 2, wherein a plurality of photoelectric conversion elements are arranged along both lateral sides of the scanning beam passage slit substantially to face each other.

* * * * *